(12) United States Patent
Lamke et al.

(10) Patent No.: US 6,978,202 B2
(45) Date of Patent: Dec. 20, 2005

(54) FOUR CHANNEL LIGHT SYSTEM FOR VEHICLES

(76) Inventors: Isidore I. Lamke, 415 Cedar St., Washington, MO (US) 63090-2404; Robert D. Plummer, 2507 Tamarack La., Union, MO (US) 63084; Michael E. Dinan, 1346 Bald Hill Rd., Leslie, MO (US) 63056; Eugene P. Reinhold, 2941 Barrett Station Rd., Kirkwood, MO (US) 63122; John Figura, 288 Boone Country La., Defiance, MO (US) 63341; Matt Narzinski, 4130 Malus Dr., St. Louis, MO (US) 63125; Ron Smith, 624 Woodland Ct., Troy, IL (US) 62294; Jeff Bohn, 3990 Providence Dr., St. Peters, MO (US) 63304; Mike Nikrant, 9611 Lakeford La., St. Louis, MO (US) 63123

( * ) Notice: Subject to any disclaimer, the term of this patent is extended or adjusted under 35 U.S.C. 154(b) by 0 days.

(21) Appl. No.: 10/786,939

(22) Filed: Feb. 23, 2004

(65) Prior Publication Data

US 2004/0167681 A1  Aug. 26, 2004

Related U.S. Application Data

(62) Division of application No. 09/905,003, filed on Jul. 13, 2001, now Pat. No. 6,847,863.

(60) Provisional application No. 60/218,106, filed on Jul. 13, 2000.

(51) Int. Cl.[7] .................. G06F 19/00; G06F 7/70
(52) U.S. Cl. .................. 701/100; 701/93; 701/96; 701/301; 340/425.5; 340/426.23; 340/436; 340/463; 340/464; 340/468
(58) Field of Search .................. 701/100, 23, 24, 701/36, 93, 96, 301; 340/425.5, 426.23, 436, 340/463, 464, 465, 468, 815.4; 180/271

(56) References Cited

U.S. PATENT DOCUMENTS

| 4,757,450 | A | * | 7/1988 | Etoh ..................... 701/96 |
| 5,801,943 | A | | 9/1998 | Nasburg |
| 6,114,951 | A | | 9/2000 | Kinoshita et al. |
| 6,252,520 | B1 | | 6/2001 | Asami et al. |
| 6,356,189 | B1 | | 3/2002 | Fujimaki |
| 6,405,120 | B1 | | 6/2002 | Higashimata et al. |
| 6,765,495 | B1 | * | 7/2004 | Dunning et al. ............ 340/903 |
| 6,847,863 | B2 | * | 1/2005 | Lamke et al. .................. 701/1 |
| 2003/0191568 | A1 | * | 10/2003 | Breed ..................... 701/36 |

* cited by examiner

Primary Examiner—Olga Hernandez
(74) Attorney, Agent, or Firm—Polster, Lieder, Woodruff & Lucchesi, L.C.

(57) ABSTRACT

A wireless transmitting/receiving system preferably operable between first and second vehicles is provided which enables the second vehicle to replicate the lighting condition of the first vehicle. In one embodiment, the replication is accomplished through a connection to the second vehicles lighting system. In another embodiment, replication is accomplished through a separate light bar mounted to the second vehicle.

8 Claims, 2 Drawing Sheets

FOUR CHANNEL LIGHT SYSTEM FOR VEHICLES

CROSS REFERENCE TO RELATED APPLICATIONS

The present application is a divisional application of U.S. patent application Ser. No. 09/905,003, filed Jul. 13, 2001, now U.S. Pat. No. 6,847,863, which claims priority of U.S. Provisional Patent Application Ser. No. 60/218,106, filed Jul. 13, 2000. The contents of both applications are expressly incorporated herein by reference.

BACKGROUND OF THE INVENTION

This invention relates to towing applications, and more particularly, to a novel method and structure for relaying braking information from a first vehicle to a second vehicle. While the invention is described with particular reference to its towing application, those skilled in the art will recognize the wider applicability of the inventive principles disclosed hereinafter.

There are a number of patents and designs for devices intended to be employed when one vehicle is being towed by another. In general, these designs, in addition to attempting to provide braking for a trailer, for example, also require electrical interconnection between the first or towing vehicle and the second or towed vehicle in order to relay lighting indications to someone following the two vehicles. Although it is possible to engage or connect the electrical system of the first vehicle with that of the second, those interconnections often are inconvenient to accomplish easily, and the interconnection, when not in use, can be damaged inadvertently. In addition, it is difficult to maintain interconnections when a single trailer or towed vehicle is being used with any one of a multiplicity of towing vehicles.

Our invention overcomes the deficiencies of the prior art by providing wireless transmission, in the embodiment illustrated, of the lighting condition of the first vehicle for replication by the second vehicle. Replication may be obtained through the second vehicles lighting system per se, or through an independent lighting bar or light system which may be easily attached to the second vehicle without reference to the lighting system of the second vehicle. The system is a microcontroller based design, which enables data to be transmitted between the vehicles reliably and effectively. The system preferably is in two designs. In the preferred design, the device has four channels of communication, which enables at least four information channels to be transmitted between the two vehicles. In the towing situation, these signals are indications for a right turn, a left turn, a taillight off or taillight on condition and a brake signal, which can be replicated by the towed vehicle without other interconnection between the two vehicles. A single channel system also is provided. In the single channel system, an indication that the trailers brake lights are operating, is signaled back to the first vehicle.

Because this system is wireless, we have included a learning algorithm which enables a transmitter/receiver of the second vehicle to learn or accept only a proper code from a single transmitter of the towing vehicle. This eliminates the possibility that a towed vehicle will receive spurious signals from another transmitter during operational use.

The system is relatively simple to maintain and easy to install, in its application and use.

BRIEF SUMMARY OF THE INVENTION

One of the objects of this invention is to provide a lighting system useful between first and second vehicles which replicates the light condition of the first vehicle at the second vehicle.

Another object of this invention is to provide a lighting system which may be easily transferred between both towing and towed vehicles in applicational use.

Yet another object of this invention is to provide a four channel wireless communication system between a first and second vehicle.

Another object of this invention is to provide a wireless system which enables a second vehicle to learn to accept signals only from a predetermined first vehicle.

Other objects of this invention will be apparent to those skilled in the art in light of the following description and accompanying drawings.

In accordance with this invention, generally stated, a system and method for wireless replicating the lighting system between two vehicles is provided. The system includes at least a transmitter in a first vehicle and a receiver in a second vehicle. The transmitter is microprocessor controlled to digitize a signal representing a first light condition of the first vehicle, and transmits that signal to a second vehicle. At the second vehicle, the light condition is decoded and a signal is developed to replicate the signal of the first vehicle. The preferred embodiment includes four separate channels or data path permitting replication of four signal conditions. The receiver of the second vehicle also is trainable to recognize a specific first vehicle transmitter, and, if desired, retrainable to recognize another transmitter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the, several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
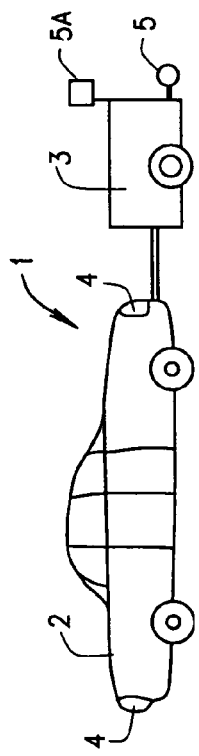
FIG. 1 is a view in side elevation of a first and second vehicle employing our new design.

Referring now to FIG. 1, reference numeral 1 indicates one illustrative application for our invention. As shown in FIG. 1, a first or lead vehicle 2 has a second or towed vehicle 3 associated with it in a conventional sense. The lead vehicle 2 has a light system 4 associated with it. The towed vehicle 3 also has a corresponding light system 5 associated with it. In the alternative, a light bar 5a may be associated with the second vehicle 3.

Figure 2:
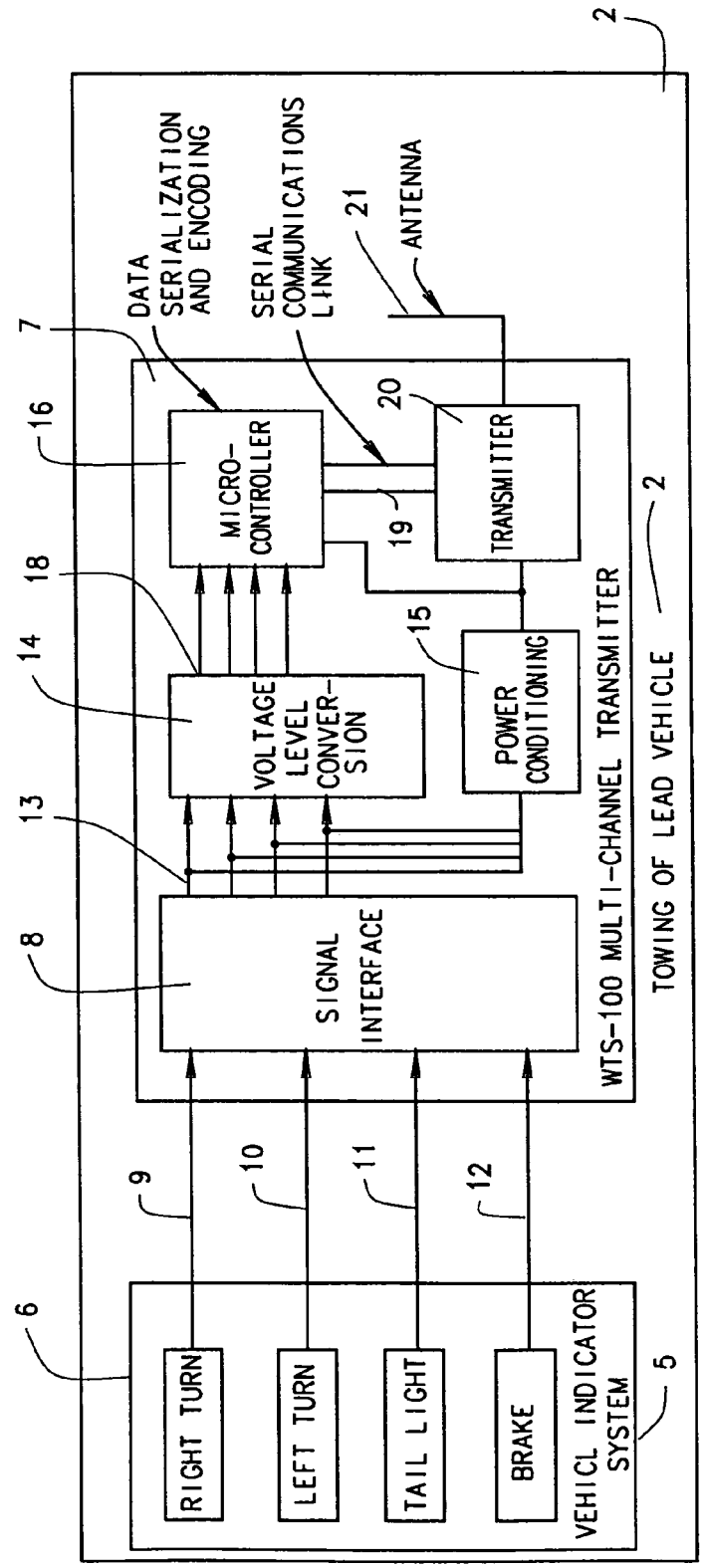
FIG. 2 is block diagrammatic view of the system employed with the towing or lead vehicle for our design.
Figure 3:
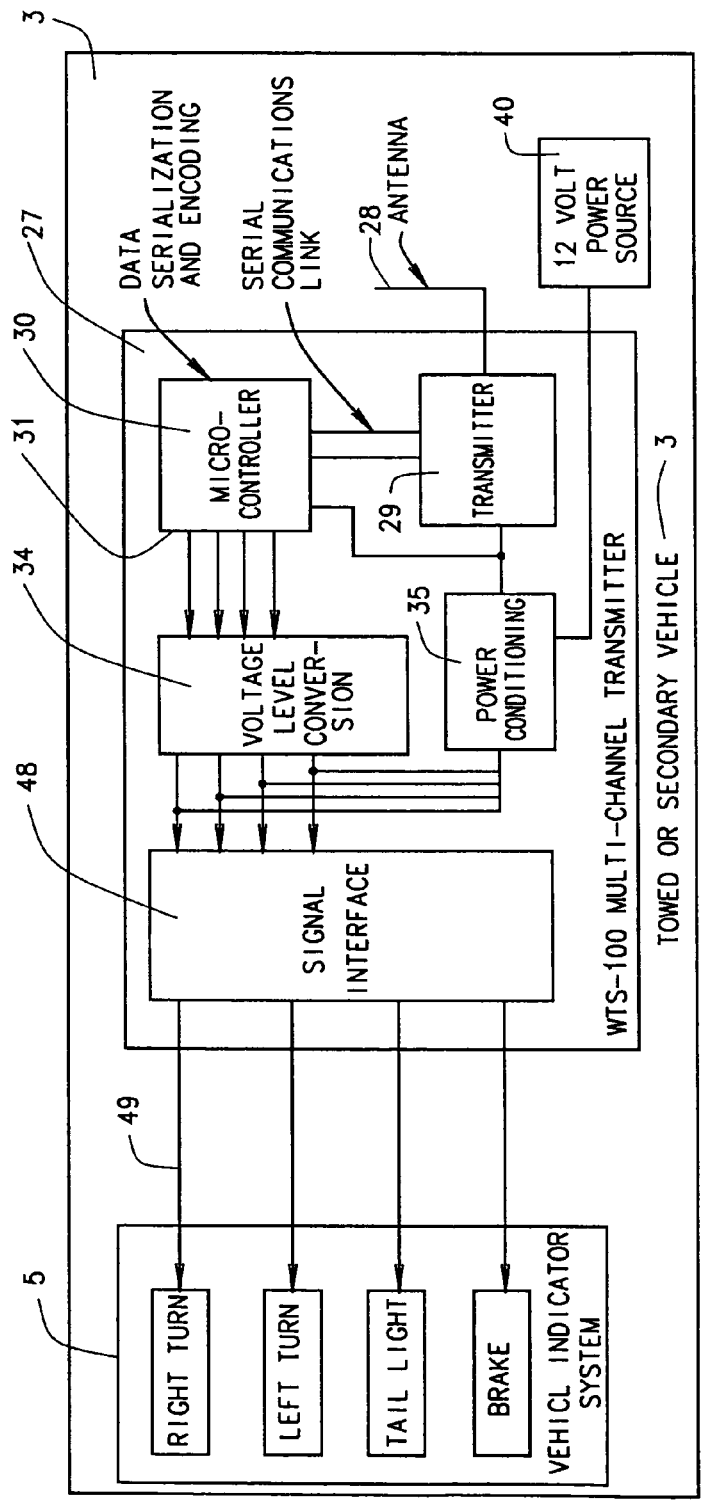
FIG. 3 is a block diagrammatic view of the system employed with the second or towed vehicle for our design.
Figure 3A:
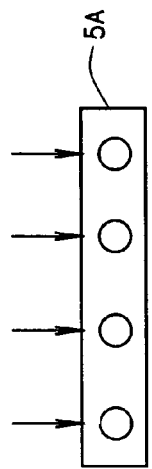
FIG. 3a is a view in side elevation of a light bar employed with our design.

As shown in FIG. 2, the light system 4 of the lead vehicle 2 has an electrical system 6 associated with it, which in the embodiment illustrated, provides right turn, left turn, taillight and brake information to a lead vehicle unit 7. Each of the signals indicated represent a channel of information, and, as described in greater detail hereinafter, the lead vehicle unit 7 is capable of processing the individual data channels for transmission to the second or towed vehicle 3.

The individual channel information from the electrical system 6 is received at the unit 7 along a signal interface 8. The signal interface 8 is designed to accept the channels 9, 10, 11 and 12, corresponding to the individual signals obtainable from the electrical system 6. The signal interface 7 has an output side 13 from which the four channel information is transmitted to a voltage level conversion system 14. The output side 13 also is fed to a power conditioning system 15, which provides power both to a microcontroller 16 and to a transmitter/receiver 20. The voltage level system 14 has an output side 18 operatively connected to the microcontroller 16.

The microcontroller 16 includes algorithm designed to convert the analog input from the individual channels 9–12 into digitized signals which are provided at an output side 19 of the microcontroller 16 to a transmitter/receiver 20. The transmitter 20 has an antenna 21 associated with it. The transmitter 20 transmits the information provided by the microcontroller 16 through the antenna 21. As will be appreciated by those skilled in the art, the notation "transmitter/receiver" merely indicates a device which may function either as a transmitter or as a receiver. Likewise, the term antenna is meant to include any of a variety of devices.

The transmitter 20 preferably operates at 916.5 megahertz. The inputs of the channels 9–12, in the embodiment illustrated, are for the right turn indicator, the left turn indicator, the brake indicator and the taillight indicator. As will be appreciated by those skilled in the art, other signals may be processed by and/or with our invention.

The second vehicle 3 has a unit 27, which, as shown in the block diagrams, is similar to the unit 7. In particular, an antenna 28 receives signal information from the antenna 21 and provides an input to a transmitter/receiver 29. The transmitter/receiver 29 feeds that signal information to a microcontroller 30 which accepts the digitized signals, and reformats the signal into a command signal at an output side 31 of the microcontroller 30. The signal forms an input to the voltage level conversion unit 34. The unit 27 also includes a power conditioning system 35 which is operatively connected to the transmitter/receiver 29 and to the microcontroller 30, and to the output side of the voltage level converter 34.

Normally, the second vehicle 3 does not include a dependent power source, and consequently, a power source 40 is shown as operatively connected to the power conditioning unit 35. The power source 40 may, and preferably does, comprise a conventional 12 volt battery. The voltage level converter unit 34 transmits the signal from the microcontroller 30 to a signal interface 48. The signal interface 48 has an output side 49 operatively connected to the light system 5 of the vehicle 3. As indicated above, in the alternative, the output 49 of the unit 48 may form an input to a light bar 5a.

The command input generated at the lead vehicle 3 by the electrical system 6 is encoded into digital bits by the unit 7, and sent to the unit 27 via the antennas, 21, 28. The unit 27 then decodes the command signal and outputs the command to the appropriate channel via the microcontroller 30. Each channel represents an indicator, and the unit 27 has full command to illuminate or extinguish the indicator as commanded by the signal received.

As indicated above, each of the units 20 and 27 has the ability to be identified by a unique identification number. Each of the receiver units also has the ability to learn a specific transmitter when placed in the appropriate mode of operation.

In the alternative, it is possible to use the system described above for other purposes. For example, the system may be used as a single channel device merely to indicate to the first vehicle a particular condition of a second vehicle. Thus, the system may be used to indicate that the brake lights, for example, the second vehicle 3 are operating properly by utilizing the transmitter 27 to transmit that information back to the vehicle 2.

The system of our invention can be used in any towing application where indicators are required. This can include towing a second vehicle as done in the RV industry or in the typical road side emergency, where a tow truck or the like is required to tow a disabled vehicle. Other applications include conventional trailer towing or slow vehicle applications, such as towing agricultural equipment between farm fields, for example.

In concise terms, our invention can be used in conjunction with a battery source to provide vehicle lighting on any towed vehicle utilizing the existing lighting system, or by adding a secondary light bar to the second vehicle.

Numerous variations, will be apparent to those skilled in the art in light of the following description and accompanying drawings. Merely by way of example, the light bar design may vary in other embodiments of the invention. While specific electrical inputs from a first vehicle for replication of second vehicle are described, other signals may be transmitted between two vehicles. For example, although lighting conditions for replication were discussed, actual brake application between the first and second vehicles may be employed in other embodiments of this invention. These variations are merely illustrative.

What is claimed is:

1. A four channel replication system comprising:
 a transmitter unit at a first vehicle, said transmitter unit including a signal interface for receiving at least one of a plurality of signals indicating a right turn signal, a left turn signal, brake lights on and headlights on status of the first vehicle, a microcontroller operatively connected to said signal interface for receiving at least one signal and converting the signal to a digital representation, and a transmitter/receiver operatively connected to said microcontroller for at least transmitting one digital signal;
 a receiver unit on a second vehicle, said receiver unit including a receiver/transmitter for receiving the digital signal, a microcontroller operatively connected to said receiver/transmitter for decoding said digital signal, for determining whether the digital signal is from the first vehicle or is a signal from a vehicle other than the first vehicle, and for transmitting a command signal if and if only if the signal is from the first vehicle; and a lighting device associated with the second vehicle responsive to the command signal from said microcontroller and visually mimicking the decoded command.

2. The system of claim 1 wherein the lighting device comprises the second vehicle running lights.

3. The device of claim 1 wherein the light device is an independent light bar mounted to the second vehicle.

4. The device of claim 1 wherein the first vehicle transmitter has a unique control command associated with it.

5. The device of claim 4 wherein the receiver at the second vehicle includes a program design to accept signals from an appropriate transmitter of the first vehicle.

6. The device of claim 5 wherein at least four different signals are received and transmitted between vehicles.

7. The device of claim 6 wherein the second vehicle also transmits command status to the first vehicle.

8. The device of claim 6 further including a source of power associated with said second vehicle.

* * * * *